(No Model.)
F. G. BURLEY.
VELOCIPEDE.
No. 264,855.   Patented Sept. 26, 1882.
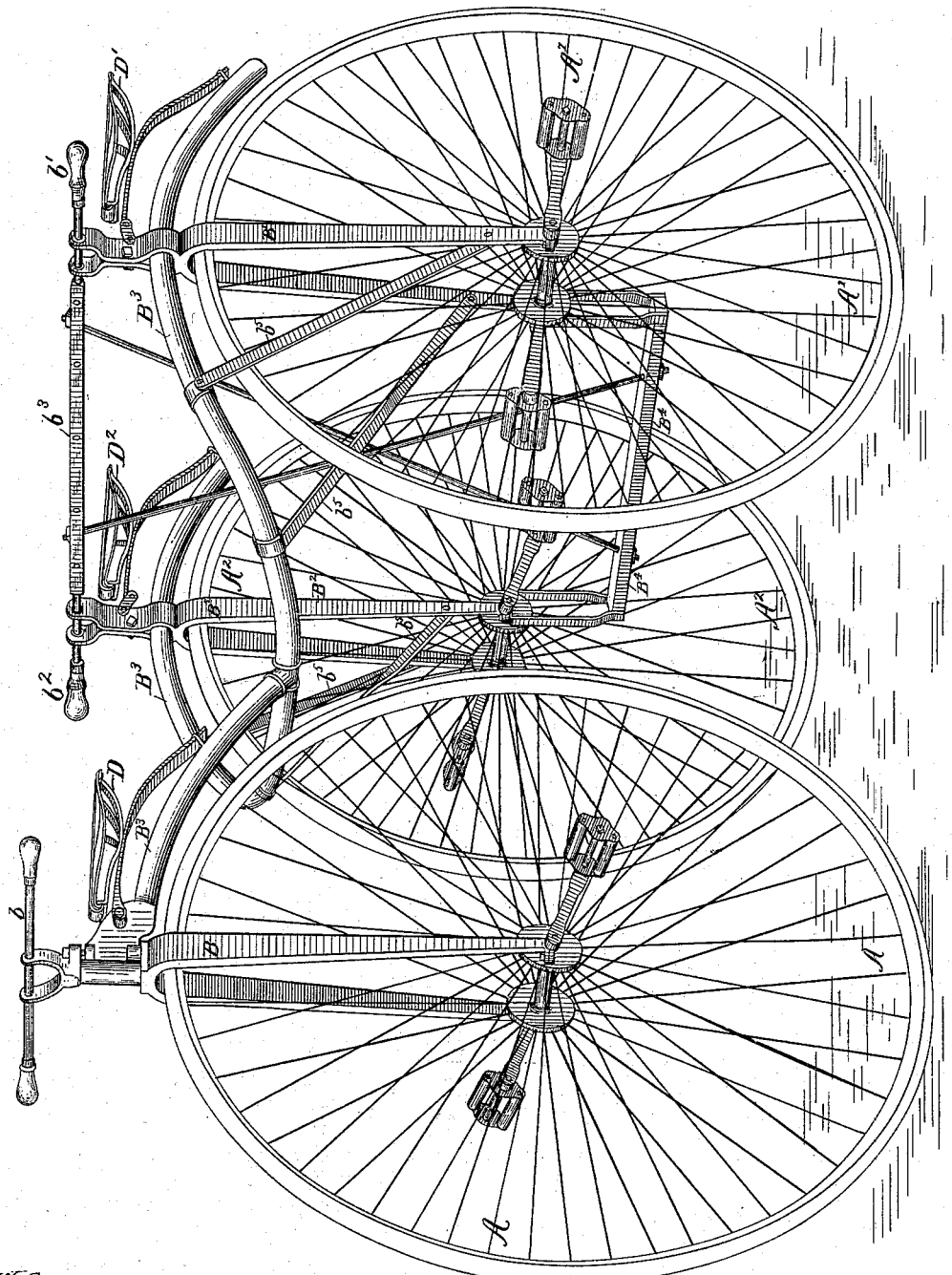
Witnesses:
Inventor:
Franklin G. Burley

UNITED STATES PATENT OFFICE.

FRANKLIN G. BURLEY, OF BOSTON, MASSACHUSETTS.

VELOCIPEDE.

SPECIFICATION forming part of Letters Patent No. 264,855, dated September 26, 1882.

Application filed September 9, 1881. (No model.)

*To all whom it may concern:*

Be it known that I, FRANKLIN G. BURLEY, of Boston, in the county of Suffolk and State of Massachusetts, have invented a new and useful Vehicle, of which the following is a specification.

My invention relates to improvements in vehicles propelled by the riders, having three or more driving-wheels, with one person riding astride of each driving-wheel, and which, when adapted for three riders, I call "triocycles."

The objects of my invention are to connect three driving-wheels, three seats, and pedals by a frame, to adapt the frame and the parts so connected for three riders, one astride of each driving-wheel, and to adapt the vehicle to sustain itself in an upright position by placing the driving-wheels in different planes. To attain these objects I construct my improved vehicle substantially as illustrated in the accompanying drawing, which is a perspective view of a triocycle constructed in the best way known to me for carrying out my invention.

The driving-wheels $A$ $A'$ $A^2$, provided with their respective cranks and pedals, carry on their axles, between the cranks and the hubs, the upright pieces $B$ $B'$ $B^2$, forked at their lower ends to span the rims and spokes, and provided with handles $b$ $b'$ $b^2$. The wheel $A$ is used for steering, and has its upright $B$ arranged to turn in the arm of the frame $B^3$. The wheels $A'$ $A^2$ have their uprights $B'$ $B^2$ fastened firmly to the frame $B^3$, and rigidly connected at top by a cross-bar, $b^3$, formed by extending the handles $b'$ and $b^2$, and at bottom by depending arms secured to the inside lower ends of the uprights $B'$ $B^2$, and rigidly connected by a cross-bar, $B^4$, which is connected with the upper cross-bar, $b^3$, by diagonal stays, which serve to brace and stiffen both of them. The frame $B^3$ connects the uprights $B'$ $B^2$ to the upright $B$ on the steering-wheel $A$. $b^5$ are diagonal stays or braces. As shown in the drawing, the steering-wheel $A$ is in front, and the seats $D'$ $D^2$ over the wheels $A'$ $A^2$ are placed on continuations of the frame; but it is evident that these seats could be placed on the frame on the other side of the uprights $B'$ $B^2$, and the seat $D$ over the steering-wheel on an extension of the arm of the frame on the other side of the upright $B$, so that the steering-wheel would be behind, and this arrangement would be better than that shown in the drawing, so far as concerns distributing the weight of the three riders upon all three driving-wheels; but nevertheless I prefer to have the single wheel in front, and therefore have adopted the arrangement shown. The same principle is applicable to four or more driving-wheels; but if more than three driving-wheels are connected the frame should be provided with suitable joints for steering.

I claim as my invention and desire to secure by Letters Patent—

The vehicle above described, consisting of three driving-wheels placed in different planes so that it will sustain itself in an upright position, three seats, and three sets of pedals connected by a frame and adapted for three riders, one astride of each driving-wheel, substantially as described.

FRANKLIN G. BURLEY.

Witnesses:
DAVID REED,
CHAS. H. CHAMPNEY.